US010846185B2

(12) United States Patent
Feng et al.

(10) Patent No.: US 10,846,185 B2
(45) Date of Patent: Nov. 24, 2020

(54) METHOD FOR PROCESSING ACQUIRE LOCK REQUEST AND SERVER

(71) Applicant: Huawei Technologies Co., Ltd., Shenzhen (CN)

(72) Inventors: Rui Feng, Beijing (CN); Guang Chen, Shenzhen (CN); Jun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 16/013,175

(22) Filed: Jun. 20, 2018

(65) Prior Publication Data

US 2018/0300210 A1 Oct. 18, 2018

Related U.S. Application Data

(63) Continuation of application No. PCT/CN2015/100006, filed on Dec. 30, 2015.

(51) Int. Cl.
*G06F 11/20* (2006.01)
*H04L 29/08* (2006.01)
*G06F 11/16* (2006.01)

(52) U.S. Cl.
CPC ...... *G06F 11/2023* (2013.01); *G06F 11/16* (2013.01); *G06F 11/203* (2013.01);
(Continued)

(58) Field of Classification Search
CPC ...... G06F 11/20; G06F 11/2023; G06F 11/16; G06F 11/203
(Continued)

(56) References Cited

U.S. PATENT DOCUMENTS 6,199,105 B1 3/2001 Soejima et al.
7,356,531 B1 * 4/2008 Popelka .............. G06F 11/2028
707/682
(Continued)

FOREIGN PATENT DOCUMENTS

CN 101196829 A 6/2008
CN 101567805 A 10/2009
(Continued)

OTHER PUBLICATIONS

Machine Translation and Abstract of Japanese Publication No. JP2011210106, Oct. 20, 2011, 25 pages.
(Continued)

*Primary Examiner* — Kamini B Patel
(74) *Attorney, Agent, or Firm* — Conley Rose, P.C.

(57) ABSTRACT

A technique for processing a lock request is provided. A first lock server is a takeover lock server of a second lock server. The first lock server enters a silent state after learning that a fault occurs in the second lock server, where a silent range is a resource for which the second lock server has assigned permission. The first lock server receives an acquire lock request that is originally sent to the second lock server, and the first lock server assigns lock permission for a corresponding resource according to the acquire lock request if the second lock server has not assigned resource for the resource. By means of this solution, an impact range of a fault occurring in a lock server can be reduced, and stability of a lock management system is improved.

20 Claims, 3 Drawing Sheets

(52) U.S. Cl.
CPC .... *H04L 67/1097* (2013.01); *G06F 2201/805* (2013.01); *G06F 2201/825* (2013.01)

(58) Field of Classification Search
USPC ...................................................... 714/4.11
See application file for complete search history.

(56) References Cited

U.S. PATENT DOCUMENTS

| | | | |
|---|---|---|---|
| 7,693,892 | B2 | 4/2010 | Koarashi |
| 8,296,599 | B1* | 10/2012 | Boyer ................... G06F 11/203 714/4.11 |
| 8,533,171 | B2 | 9/2013 | Patwardhan |
| 8,566,298 | B1* | 10/2013 | Nagaralu ............ G06F 16/2343 707/704 |
| 9,189,512 | B2* | 11/2015 | Kohno ................... G06Q 40/02 |
| 9,514,160 | B2 | 12/2016 | Song et al. |
| 2003/0225884 | A1 | 12/2003 | Hayden |
| 2004/0230972 | A1* | 11/2004 | Donovan ................ G06F 9/544 718/1 |
| 2005/0223005 | A1* | 10/2005 | Shultz ................... G06F 12/084 |
| 2006/0212453 | A1 | 9/2006 | Eshel et al. |
| 2008/0250213 | A1* | 10/2008 | Holt .................... G06F 11/1658 711/159 |
| 2008/0263549 | A1 | 10/2008 | Walker |
| 2008/0319996 | A1 | 12/2008 | Cook |
| 2012/0060160 | A1* | 3/2012 | Krauss ................... G06F 9/526 718/102 |
| 2012/0117131 | A1 | 5/2012 | Maruyama et al. |
| 2012/0259820 | A1 | 10/2012 | Patwardhan |
| 2013/0174165 | A1 | 7/2013 | Chopra |
| 2014/0136502 | A1 | 5/2014 | Mohamed et al. |
| 2015/0160986 | A1 | 6/2015 | Ni et al. |
| 2015/0186201 | A1 | 7/2015 | Ran |
| 2015/0347239 | A1 | 12/2015 | Chan et al. |
| 2017/0242762 | A1* | 8/2017 | Feng ................... G06F 16/1774 |

FOREIGN PATENT DOCUMENTS

| | | |
|---|---|---|
| CN | 103634347 A | 3/2014 |
| CN | 103731485 A | 4/2014 |
| CN | 103812685 A | 5/2014 |
| CN | 104702655 A | 6/2015 |
| EP | 3059932 A1 | 8/2016 |
| JP | H11338843 A | 12/1999 |
| JP | 2005528684 A | 9/2005 |
| JP | 2006525573 A | 11/2006 |
| JP | 2011210106 A | 10/2011 |
| JP | 2011242949 A | 12/2011 |
| JP | 2014048969 A | 3/2014 |
| WO | 2016074167 A1 | 5/2016 |

OTHER PUBLICATIONS

Machine Translation and Abstract of Japanese Publication No. JP2014048969, Mar. 17, 2014, 33 pages.
Nitta, J., et al., "A design for Distributed Lock Manager in Shared-Disk DB Cluster," General Incorporated Association Information Processing Society of Japan, Technical Report Information Technology and Access Technology (IFIT) No. 107, Nov. 5, 2012, 13 pages.
English Translation of Nitta, J., et al., "A design for Distributed Lock Manager in Shared-Disk DB Cluster," General Incorporated Association Information Processing Society of Japan, Technical Report Information Technology and Access Technology (IFIT) No. 107, Nov. 5, 2012, 15 pages.
Srinivasan, A., "Multiprotocol Locking and Lock Failover in OneFS," EMC, Isilon Storage Division, 2013, 27 pages.
Foreign Communication From a Counterpart Application, Japanese Application No. 2017-522597, Japanese Office Action dated Feb. 6, 2018, 6 pages.
Foreign Communication From a Counterpart Application, Japanese Application No. 2017-522597, English Translation of Japanese Office Action dated Feb. 6, 2018, 7 pages.
Foreign Communication From a Counterpart Application, European Application No. 15911889.2, Extended European Search Report dated Feb. 5, 2018, 8 pages.
Foreign Communication From a Counterpart Application, PCT Application No. PCT/CN2015/100006, English Translation of International Search Report dated Oct. 12, 2016, 2 pages.
Machine Translation and Abstract of Chinese Publication No. CN101196829, Jun. 11, 2008, 12 pages.
Machine Translation and Abstract of Chinese Publication No. CN101567805, Oct. 28, 2009, 25 pages.
Machine Translation and Abstract of Chinese Publication No. CN103731485, Apr. 16, 2014, 23 pages.
Foreign Communication From a Counterpart Application, Chinese Application No. 201580008587.3, Chinese Office Action dated May 22, 2019, 9 pages.

* cited by examiner

METHOD FOR PROCESSING ACQUIRE LOCK REQUEST AND SERVER

CROSS-REFERENCE TO RELATED APPLICATION

This application is a continuation of International Application No. PCT/CN2015/100006, filed on Dec. 30, 2015, the disclosure of which is hereby incorporated by reference in its entirety.

TECHNICAL FIELD

The present disclosure relates to computer technologies, and in particular, to a method for processing a lock request and a server.

BACKGROUND

In a distributed system including multiple hosts, mutually exclusive access to a same resource by multiple nodes at the same time is implemented using a lock server. When needing to perform some operations on a resource, a host first needs to request lock permission from the lock server. The host can perform a corresponding operation, for example, a read operation or a write operation, on the resource only after the host obtains the lock permission. Therefore, performance, availability, and reliability of the lock server directly affect performance, availability, and reliability of the entire distributed system.

In the distributed system, a host communicates with a node using a network attached storage (NAS) network. A lock server is disposed in each node, each node is further connected to a storage system, and a resource, for example, a file, is stored in the storage system.

When needing to perform an operation (for example, a read operation or a write operation) on the resource in the storage system, the host first applies to a lock server for lock permission using an application program on the host, and then performs the operation on the file after obtaining the lock permission assigned by the lock server for the resource. A correspondence between lock permission that has been assigned for a resource and an application program may be stored in each node, or may be stored in a shared storage that can be accessed by each node. For example, when needing to perform a read operation on a file in the storage system, the host first applies to a lock server in a node for lock permission for the file, and can perform a read operation on the file only after the host obtains the lock permission for the file. A correspondence between lock permission for a file and an application having the lock permission is stored in a node, and a node or an application on a node has lock permission. Even if a node has lock permission, the node may still learn, by means of a further analysis, which application on the node needs to use a resource in the storage system.

When a fault occurs in a lock server, a service on the faulty lock server needs to be switched to a lock server in which no fault occurs (which is referred to as a non-faulty lock server below). When a protocol, such as a Network File System (NFS) or Samba, is used, and when the service on the faulty lock server is switched to the non-faulty lock server, a host may reapply, using a reclaim lock request, for lock permission that has been obtained for a file by each application, to increase access efficiency of the host. In this way, in a distributed lock server cluster, a reclaim lock request and an acquire lock request need to be securely controlled, to avoid a problem that data viewed by multiple applications is inconsistent because lock permission is inappropriately controlled, and that even data corruption is caused when multiple applications read and write data at the same time.

In other approaches, when a fault occurs in a lock server, all remaining lock servers in the distributed system enter a silent state. During silence, all the lock servers in the distributed system can process only a reclaim lock request for reapplying for lock permission, and cannot process an acquire lock request for applying for new lock permission. Only after processing on a reclaim lock request for lock permission that has been granted by the faulty lock server is completed, the lock servers in the distributed system exit the silent state, and normally process an acquire lock request.

In the foregoing prior-art solution, when a fault occurs in a lock server in the distributed system, all remaining lock servers in the distributed system need to enter a silent state. In this case, the lock servers refuse to process an acquire lock request sent by any lock server, resulting in a noticeable deterioration in performance and reliability of the system.

SUMMARY

According to a first aspect of the present disclosure, a method for processing a lock request is provided, and can be applied to a first lock server, where the first lock server is a takeover lock server of a second lock server, the first lock server stores a lock management range of the second lock server, and the method includes entering, by the first lock server, a silent state after learning that a fault occurs in the second lock server, where a silent range of the silent state is a resource for which the second lock server has assigned permission; receiving, by the first lock server, a first acquire lock request, where the first acquire lock request is used to request to lock a first resource, and the first acquire lock request carries an identifier of the first resource; detecting, by the first lock server, that the first resource belongs to the management range of the second lock server; and querying, by the first lock server, a first resource information record list, where the first resource information record list records an identifier (ID) of the resource for which the second lock server has assigned lock permission; and if the first resource information record list does not record the identifier of the first resource, assigning, by the first lock server, lock permission for the first resource according to the first acquire lock request.

By means of the method, when a fault occurs in the second lock server, the first lock server is only partially silent. During silence, the first lock server may process an acquire lock request for which the second lock server has not assigned lock permission, thereby improving system efficiency.

In addition, by means of the method, when the first lock server is silent, a resource in an original management range of the first lock server is not included in the silent range, and therefore may be normally processed. Moreover, in a distributed lock management system including the first lock server, the second lock server, and another lock server, when the first lock server is silent, a lock server other than the first lock server and the second lock server may not be silent, and continues to work normally.

In a first possible implementation manner of the first aspect, the method further includes receiving, by the first lock server, a second acquire lock request, where the second acquire lock request is used to request to lock a second resource, and the second acquire lock request carries an identifier of the second resource; detecting, by the first lock server, that the second resource belongs to a management range of the first lock server; and assigning, by the first lock server, lock permission for the second resource according to the second acquire lock request.

By means of the method, when the first lock server is silent, a resource in an original management range of the first lock server is not included in the silent range, and therefore may be normally processed.

Based on any aspect or any implementation manner described above, in a second possible implementation manner of the first aspect, after the entering, by the first lock server, a silent state, the method may further include receiving, by the first lock server, a third acquire lock request, where the third acquire lock request is used to request to lock a third resource, and the third acquire lock request carries an identifier of the third resource; detecting, by the first lock server, that the third resource belongs to the management range of the second lock server; and querying, by the first lock server, the first resource information record list; and if the first resource information record list has recorded the ID of the resource requested in the third acquire lock request, refusing, by the first lock server, to assign lock permission for the third resource according to the third acquire lock request.

By means of the method, the first lock server refuses to process an acquire lock request for a resource for which the second lock server has assigned permission, thereby avoiding a lock acquiring conflict.

Based on any aspect or any implementation manner described above, in a third possible implementation manner of the first aspect, the method may further include recording, by the first lock server, the identifier of the first resource into a second resource information record list, where the second resource information record list is used to record an ID of a resource for which the first lock server has assigned lock permission, and the second resource information record list is stored in a third lock server.

By means of the method, a lock acquiring status of the first lock server may be recorded. After a fault occurs in the first lock server in the future, a takeover lock server corresponding to the first lock server may take over from the first lock server. A takeover method is similar to that described above.

Based on any aspect or any implementation manner described above, in a fourth possible implementation manner of the first aspect, a step of storing, by the first lock server, the lock management range of the second lock server includes receiving, by the first lock server, a first notification message, where the first notification message carries identification information of the second lock server; determining, by the first lock server according to an identifier of the second lock server and a lock server takeover relationship, that the first lock server is the takeover lock server of the second lock server; and receiving, by the first lock server, the lock management range of the second lock server and storing the lock management range.

By means of the method, a solution about how the first lock server obtains the lock management range of the second lock server is provided.

Based on any aspect or any implementation manner described above, in a fifth possible implementation manner of the first aspect, the method may further include receiving, by a protocol server, a packet from a host, and parsing out the first acquire lock request from the packet; forwarding, by the protocol server, the first acquire lock request to a lock proxy; and performing, by the lock proxy, determining according to the identifier of the first resource carried in the first acquire lock request; and when determining that the first lock server manages the first resource, sending the first acquire lock request to the first lock server.

By means of the method, the protocol server and the lock proxy are added, and a lock management technology that is jointly executed by the lock server, the protocol server, and the lock proxy is provided.

Based on any aspect or any implementation manner described above, in a sixth possible implementation manner of the first aspect, the method may further include, after the entering, by the first lock server, a silent state, receiving a reclaim lock request, where the reclaim lock request carries an identifier of a fourth resource and permission that is assigned by the second lock server for the fourth resource, and the fourth resource is a resource for which the second lock server has assigned permission; and reassigning the same permission for the fourth resource according to the permission that has been assigned by the second lock server.

By means of the method, during silence, the reclaim lock request is processed, to recover lock permission that has been assigned before the fault occurs in the second lock server.

Based on any aspect or any implementation manner described above, in a seventh possible implementation manner of the first aspect, the method may further include, after permission is reassigned for all resources for which the second lock server has assigned permission, exiting, by the first lock server, the silent state; or after a preset time, exiting, by the first lock server, the silent state.

By means of the method, a silence exiting mechanism is provided in order to prevent the lock server from being in a silent state for a long time.

Optionally, in an eighth possible implementation manner of the first aspect, after the exiting, by the first lock server, the silent state, the method further includes updating, by the first lock server, the management range of the first lock server, where an updated management range of the first lock server includes the management range of the first lock server and the management range of the second lock server.

Optionally, the takeover relationship may be calculated by a management node and then broadcast to each lock server, or may be updated by each lock server itself.

By means of the method, an entire procedure in which the first lock server takes over from the second lock server is completed.

In a ninth possible implementation manner of the first aspect, the first resource information list may be stored in the first lock server, or may be stored in another lock server or a non-lock server, as long as the first resource information record list can be obtained by the first lock server.

By means of the method, storage flexibility of the first resource information list is improved, and this helps a user to design a product according to an actual need.

In a tenth possible implementation manner of the first aspect, each aspect and implementation manner may be implemented in a virtual machine environment, that is, the lock server runs in a virtual machine. Therefore, the lock server may have three possible implementation manners: hardware, software executing hardware, and software running in a virtual machine.

In an eleventh possible implementation manner of the first aspect, after a takeover starts, for example, during silence, the first lock server further sends a query message to a lock proxy of a non-faulty node; after receiving the query message, the lock proxy of the non-faulty node sends a feedback message to the first lock server, where the feedback message carries lock permission that is obtained through application by the lock proxy using the second lock server, and the first lock server records the lock permission into a detailed resource information record list.

The present disclosure further provides implementation manners of a lock request management apparatus and a server, and the lock request management apparatus and the server have functions in the first aspect and the possible implementation manners.

Correspondingly, the present disclosure further provides a non-volatile computer readable storage medium and a computer program product. When computer instructions included in the non-volatile computer readable storage medium and the computer program product are loaded to a memory of a storage device provided in the present disclosure, and a central processing unit (Central Processing Unit, CPU) executes the computer instructions, the storage device is enabled to separately perform possible implementation solutions in the first aspect and the possible implementation manners, and the solutions may run in an apparatus or a server for execution.

DESCRIPTION OF EMBODIMENTS

Figure 1:
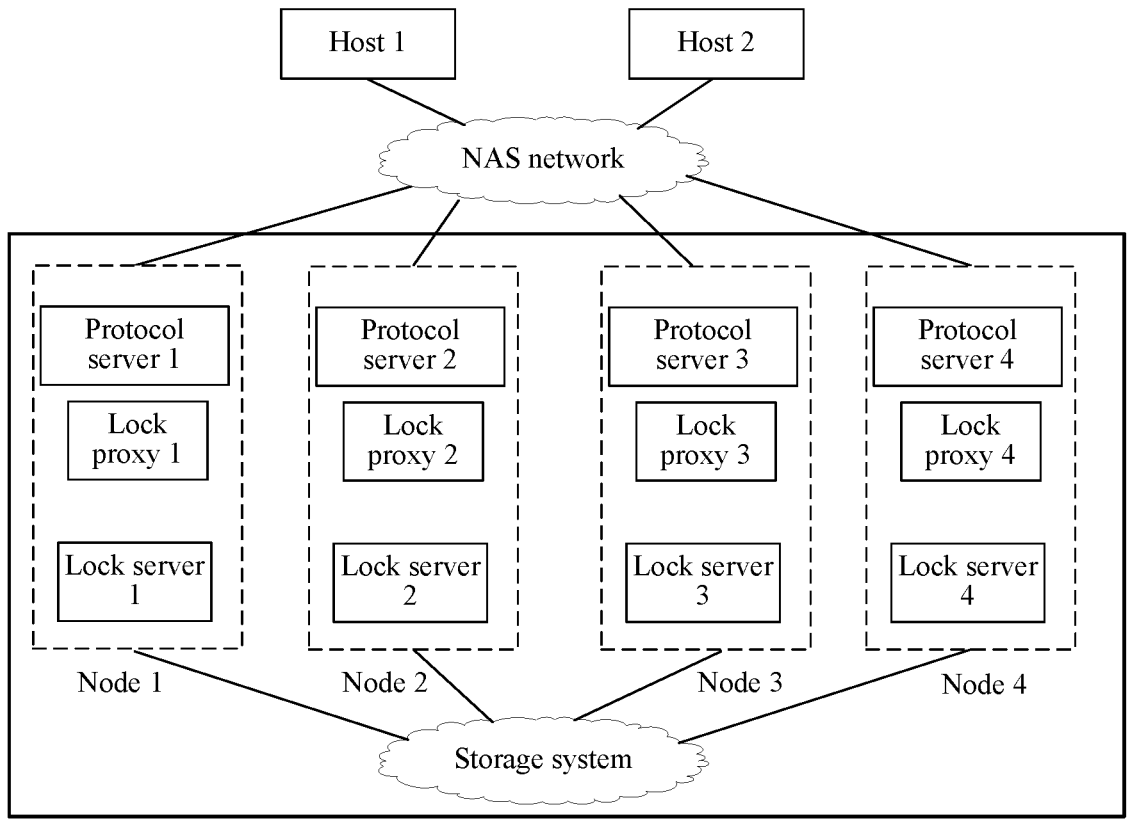
FIG. 1 is a topology diagram of a use environment of a lock management system according to an embodiment of the present disclosure.

The following clearly and describes the technical solutions in the embodiments of the present disclosure with reference to the accompanying drawings in the embodiments of the present disclosure. Apparently, the described embodiments are only some embodiments rather than all the embodiments of the present disclosure.

In the embodiments of the present disclosure, establishing a takeover relationship between lock servers is proposed. In this way, when a fault occurs in a lock server, a takeover lock server of the faulty lock server may be got according to the takeover relationship.

A lock server is a server that can process a lock request. A lock request may be an acquire lock request or a reclaim lock request. The acquire lock request may be a read lock request or a write lock request. The acquire lock request is used to apply for locking a resource. After lock acquiring, a permission owner obtains lock permission, that is, only the permission owner has corresponding operation permission for the resource. For example, the read lock request is used to apply for obtaining permission to read a resource; the write lock request is used to apply for permission to write data to a resource. The reclaim lock request is used by a permission owner to reapply for lock permission that is already obtained. For example, a host originally accesses a storage system using a node 1. Then, a fault occurs in the node 1, and the host accesses the storage system using a node 2 instead. The host sends a reclaim lock request to the node 2 in order to obtain lock permission that has been obtained previously.

The lock request may further include a release lock request, where the release lock request is used to release lock permission for a file such that another host may apply for the lock permission for the file.

When a fault occurs in a lock server, which is referred to as a faulty lock server, lock management work of the faulty lock server is taken over by a takeover lock server of the faulty lock server. Only the takeover lock server enters a silent state, and remaining lock servers do not enter the silent state, and may normally process a lock request. Compared with other approaches, this reduces impact caused by the fault of the lock server to an entire system.

Further, even if the takeover lock server has entered the silent state, the takeover lock server enters the silent state for only some resources. Therefore, the takeover lock server can still normally respond to some acquire lock requests (acquire lock requests for resources that are not in the silent state). In this way, utilization of the lock server is further improved, and impact caused to the system by the lock server after the lock server enters the silent state is reduced. For a resource in the silent state, the lock server does not process an acquire lock request. For the resource in the silent state, the lock server can process a reclaim lock request. For a lock request for a resource in a non-silent state, the lock server can process an acquire lock request. For example, lock permission is given in response to a read lock request for a resource; in response to a write lock request for a resource, lock permission is given by recycling a write lock that is already assigned. Entering the silent state for some resources may be considered as entering the silent state for acquire lock requests for the some resources. The some resources are resources for which the faulty lock server has assigned permission, and the takeover lock server of the faulty lock server enters the silent state.

An acquire lock request originally managed by the takeover lock server maintains in a normal state, and is not affected by the silent state. If a received acquire lock request is in a management range of the faulty lock server, and before this, the faulty lock server has not assigned lock permission for a resource requested in the lock request, the takeover lock server may normally respond to the lock request, and assign lock permission for the lock request. If a received acquire lock request is in a management range of the faulty lock server, and before this, the faulty lock server has assigned lock permission for a resource requested in the lock request, the takeover lock server refuses to assign lock permission for the lock request.

The acquire lock request originally managed by the takeover lock server is not affected by the silent state, and the takeover lock server does not enter the silent state for the acquire lock request. A processing manner for the acquire lock request is the same as that used before the takeover lock server enters the silent state, and therefore may not need to be described in detail. Unless otherwise noted below, an "acquire lock request" refers to an acquire lock request that is originally in a management range of a faulty lock server and that is taken over by a takeover lock server after a fault occurs in the faulty lock server.

This embodiment of the present disclosure may be applied to a distributed system. The distributed system includes multiple nodes, and each node manages lock permission for some files. For example, a node is a lock server, and may include a processor, an external interface, and a memory. When a fault occurs in a lock server in the distributed system, a non-faulty lock server in the distributed system enters a silent state, and a method for managing lock permission is provided. The node may further integrate a protocol server and a lock proxy, and becomes a combination of the lock server, the protocol server, and the lock proxy.

After assigning lock permission, the lock server backs up, into a specified lock server, an identifier of a resource for which the lock permission has been assigned. The specified lock server may be a takeover lock server of the lock server, or may be another lock server that can be accessed by a backup server of the lock server. After receiving an acquire lock request, the takeover lock server of the faulty lock server determines, according to the backed-up identifier of the resource, whether lock permission requested in the acquire lock request has been assigned; and if the lock permission has been assigned, returns a rejection response message; or if the lock permission has not been assigned, assigns the lock permission requested in the acquire lock request to the host. The node may include only the lock server, or may integrate other function modules, such as a protocol server and a lock proxy.

After assigning the permission, the lock server generates an assignment record. Assignment record information is, for example, {node 1, file A, write permission}, indicating that a node 1 assigns a write permission for a file A; or {node 2, file B, read permission}, indicating that a node 2 has a read permission for a file B. According to a host that sends the acquire lock request, the protocol server may change the assignment record of the node into an assignment record of the host. For example, if a host 1 sends the acquire lock request, the node 1 is changed into the host 1, and the assignment record information becomes {host 1, file A, write permission}, indicating that the host 1 has write permission for the file A. The node may send the information to the corresponding host for storage.

An identifier of a resource for which lock permission is assigned is backed up into a specified server, for example, a backup lock server of a lock server that assigns the permission, or another lock server. Specific content of the lock permission may not be backed up. That is, the specified server knows a resource for which lock permission is assigned, but does not know what the lock permission is. Because the lock server may back up only the identifier of the resource for which the lock permission is assigned, and may not back up the specific content of the lock permission, the backup occupies few system resources, and does not cause great impact to resources of the distributed system.

The distributed system mentioned in this embodiment of the present disclosure includes multiple nodes, and the host communicates with the nodes using an NAS network, and the nodes are connected to the storage system. A resource stored in the storage system is provided to the host for use. The host applies for lock permission for the resource using a node, and a lock server in the node manages the lock permission.

A node and a storage device may be separated, or may be combined together. Each node has a protocol server and a lock proxy. A lock request from the host may be based on the NFS protocol, or based on the Server Message Block (SMB) protocol. The protocol server may process one or more protocols from the host. For example, an NFS server supports the NFS protocol, and an SMB server supports the SMB protocol. Working principles of communication between different protocol servers and an upper-layer host are similar. The lock request processed by the protocol server may be used by the lock proxy.

As shown in FIG. 1, two hosts and four nodes in the distributed system are used as an example for description. Quantities of hosts and nodes may be adjusted according to a requirement, and implementation principles thereof are the same. A host accesses the storage system using a node. In a node, a protocol server is in a one-to-one correspondence with a lock proxy. For example, in the node 1, a protocol server 1 is in a one-to-one correspondence with a lock proxy 1; in a node 2, a protocol server 2 is in a one-to-one correspondence with a lock proxy 2; and so on. A signal is transferred between the protocol server and the lock proxy according to the correspondence.

A lock server may be located in a same node together with a protocol server and a lock proxy, or may be separately located in an independent node, or may be located in another node. Communication inside a node is performed using a computer internal protocol, for example, a bus. Communication between nodes may be performed using a network, such as an FC or the Ethernet. In this embodiment of the present disclosure, an example in which the server, the protocol server, and the lock proxy are located in one node is used for description. For example, the protocol server 1, the lock proxy 1, and a lock server 1 are located in the node 1. Each lock server may grant different lock permission to lock proxies in different nodes. A lock proxy in a node may apply to a lock server in this node for permission, or may apply to a lock server in another node for lock permission.

A management node may be separately disposed in the distributed system to control and manage nodes, or any node may additionally control and manage all the nodes. The node that manages and controls the nodes is usually a primary node, and may also be referred to as a management node. This is not limited in this embodiment of the present disclosure, and is not separately shown in the figure, either.

When a read/write operation needs to be performed on a resource (such as a file, a directory, a file block, or a data block) in the storage system, the host sends a lock request to a corresponding protocol server using a network. The host may determine the corresponding protocol server according to information carried in the lock request, or may determine the corresponding protocol server according to an IP address segment. An existing implementation manner may be used in both cases, and this is not limited in this embodiment of the present disclosure. After receiving the lock request, the protocol server sends the lock request to a lock proxy corresponding to the protocol server.

The lock proxy determines, according to a lock server management range, which lock server processes the lock request, and then sends the lock request to the determined lock server for processing. The lock server management range may be preset, or may be determined using a consistent hashing ring. The lock server management range may be stored in a cache of the node in which the lock proxy is located, or may be stored in a shared storage, and is shared by lock proxies in the distributed system.

For example, after receiving an acquire lock request, the lock proxy 2 determines, according to a locally stored lock server management range, that the acquire lock request should be processed by a lock server 3, and sends the acquire lock request to the lock server 3 for processing. Alternatively, the lock server management range may not be locally stored, but instead, the lock request carries an ID of a file, and the lock proxy may learn, by means of querying or calculation, which lock server manages lock permission for the file. Alternatively, the lock proxy may directly send the lock request to a lock server that is located in a same node together with the lock proxy, and the lock server located in the same node then forwards, according to the lock server management range, the lock request to a lock server that is responsible for processing the lock request. For example, the lock proxy 2 sends the received acquire lock request to the lock server 2, the lock server 2 determines, according to the locally stored lock server management range, that a lock server 4 should be responsible for processing the acquire lock request, and the lock server 2 forwards the acquire lock request to the lock server 4 for processing. The two processing manners may be implemented using an existing technology, and are not further described herein.

A lock server stores lock permission assigned by the lock server. A lock proxy stores lock permission for which the lock proxy applies to a lock server. When the lock server management range in the distributed system is changed, the management node in the distributed system instructs the lock server and the lock proxy to update the corresponding lock server management range. Alternatively, the management node may update the lock server management range, and then broadcast an update result to lock proxies and lock servers in the distributed system.

After the lock server receives the lock request, when the lock server is in a normal working state (that is, not in a silent state), a manner for processing the lock request by the lock server is the same as that in other approaches, for example, assigning lock permission to the host according to the lock request. This is not further described herein.

The distributed system in this embodiment of the present disclosure may be a virtualized distributed system, and a lock server runs in a virtual machine. A lock proxy and a protocol server may also run in a virtual machine. Because functions thereof are similar to those in a non-virtualized environment, descriptions are not provided separately.

Figure 2:
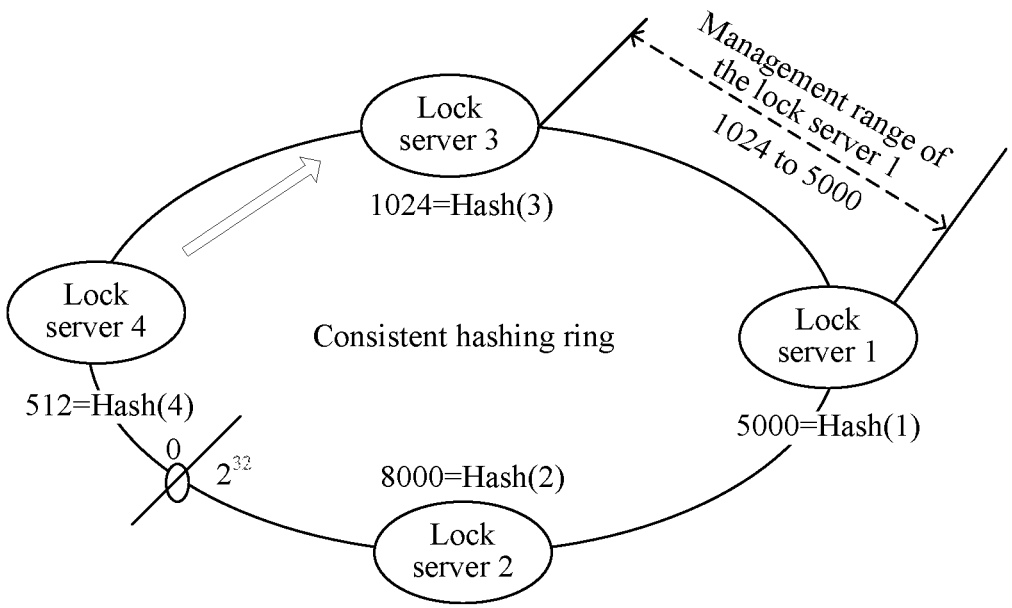
FIG. 2 is a schematic diagram of an embodiment of a lock server management range and a lock server takeover relationship according to the present disclosure.

For a lock server management range and a lock server takeover relationship in the distributed system, refer to FIG. 2.

As shown in FIG. 2, lock servers logically form a ring. The lock server management range in the distributed system is determined in an anti-clockwise direction of a consistent hashing ring (in another implementation manner, a clockwise direction may be used). The consistent hashing ring is obtained by means of calculation according to IDs of the lock servers in the distributed system. For example, in the distributed system, an ID of the lock server 1 is 1, an ID of the lock server 2 is 2, an ID of the lock server 3 is 3, and an ID of the lock server 4 is 4. The lock servers respectively perform hash calculation on the IDs using a consistent hashing algorithm, and calculation results are arranged in a clockwise direction in ascending order, to form a consistent hashing ring. In this way, consistent hashing rings obtained by the lock servers are the same. As shown in FIG. 2, a consistent hashing ring is $0-2^{32}$, results obtained by performing hash calculation on the IDs of the lock servers are sequentially hash(1)=5000, hash(2)=8000, hash(3)=1024, and hash(4)=512. In a clockwise direction, starting from 0, a sequence of locations of the lock servers on the hashing ring is: the lock server 4, the lock server 3, the lock server 1, and the lock server 2. In this case, a management range of the lock server 4 is $[8000,2^{32}]$ and [0.512], a management range of the lock server 3 is [512, 1024], a management range of the lock server 1 is [1024, 5000], and a management range of the lock server 2 is [5000, 8000]. In this case, in the ring logically formed by the lock servers in FIG. 2, the takeover relationship between the lock servers is determined in a clockwise direction of the consistent hashing ring, that is, a takeover lock server of the lock server 1 is the lock server 2, a takeover lock server of the lock server 2 is the lock server 4, a takeover lock server of the lock server 4 is 3, and a takeover lock server of the lock server 3 is 1.

Certainly, this embodiment of the present disclosure provides a method for determining a takeover server of a lock server. It should be noted that a takeover relationship is not unique, as long as each lock server can have a takeover server. For example, a manager may configure a takeover server for each lock server. For example, the lock server 2 is configured as the takeover lock server of the lock server 1, the lock server 3 is configured as the takeover lock server of the lock server 2, the lock server 4 is configured as the takeover lock server of the lock server 3, and the lock server 1 is configured as the takeover lock server of the lock server 4.

One lock server may take over from multiple lock servers. For example, if a fault occurs in both the lock server 3 and the lock server 1, a takeover lock server of the lock server 3 and the lock server 1 is the lock server 4.

In this embodiment of the present disclosure, after receiving a lock request (for example, a reclaim lock request or an acquire lock request), a lock proxy determines, according to a stored lock server management range, a lock server that should process the lock request. When determining that a fault occurs in the lock server that should process the lock request (when a fault occurs in the lock server, the management node broadcasts a notification message to the lock proxies in the distributed system), the lock proxy determines a takeover lock server according to a lock server takeover relationship, and sends the lock request to the takeover lock server for processing.

The lock server management range and the lock server takeover relationship may be both configured by the management node, and sent to all the lock proxies for storage or may be sent to the lock proxies after the management node obtains a consistent hashing ring by means of calculation. Alternatively, the management node may configure the lock proxies in advance, and the lock proxies separately perform calculation to obtain a same consistent hashing ring.

After receiving the lock request, the lock proxy performs, using the consistent hashing algorithm, hash calculation on a file identifier carried in the lock request, to determine a range within which a calculation result falls, and then a corresponding lock server is responsible for processing the lock request. For example, the lock request is an acquire lock request, and a file identifier (for example, a file name) carried in the acquire lock request is (foo1.txt). The lock proxy performs hash calculation on (foo1.txt), and an obtained result is 4500 such that the acquire lock request should be managed by the lock server 1, and the lock proxy sends the acquire lock request to the lock server 1. For another example, the lock request is a reclaim lock request, and file information carried in the reclaim lock request is (foo8.txt). The lock proxy performs hash calculation on (foo8.txt), and an obtained result is 9000 such that the reclaim lock request should be managed by the lock server 4, and the lock proxy sends the reclaim lock request to the lock server 4.

When the takeover lock server is silent, for a resource in a silent range, the host may re-obtain, from the takeover lock server using a reclaim lock request, permission for which the host has previously applied to the faulty lock server. If execution of the reclaim lock request has not been completed before the takeover lock server exits the silent state, the reclaim lock request to be executed is no longer executed. For details of a reclaim lock request part, refer to step 309.

After a fault occurs in a lock server, a lock proxy identifies the faulty lock server in the consistent hashing ring as faulty. After receiving a lock request, the lock proxy performs hash calculation on a file identifier carried in the lock request, and determines, according to a lock server management range, a lock server whose management range includes a calculation result. If the determined lock server is in a faulty state, the lock proxy further determines a takeover lock server of the faulty lock server according to a lock server takeover relationship, and sends the lock request to the takeover lock server for processing. After receiving the lock request, the takeover lock server performs hash calculation according to the file identifier, to obtain a hash value. The takeover lock server finds that the hash value falls within its own management range, and therefore needs to process the lock request itself. If another non-lock server receives the lock request, then performs hash calculation according to the file identifier, to obtain a hash value, and finds that the hash value does not fall within its own takeover range, the non-lock server does not perform processing.

For example, a fault occurs in the lock server 2 in the distributed system, and after receiving a notification message, the lock proxy identifies the lock server 2 in the consistent hashing ring as faulty. File information carried in a reclaim lock request received by the lock proxy is (foo5.txt), and the lock proxy performs hash calculation on (foo5.txt). An obtained result is 7000, and according to a lock management range, the lock server 2 should be responsible for processing the reclaim lock request, but the lock server 2 is currently in a faulty state. According to the lock server takeover relationship, a takeover lock server of the faulty lock server 2 is the lock server 4. Therefore, the lock proxy sends the reclaim lock request to the takeover lock server 4 for processing. The lock server 4 performs hash calculation on (foo5.txt), and an obtained result is 7000, and belongs to a takeover range of the lock server 4. Therefore, the lock server 4 processes the reclaim lock request.

When a host needs to perform an operation on a file in the distributed system, the host sends a lock request to a protocol server using an application on the host. The protocol server sends the lock request to a corresponding lock proxy. The lock proxy performs hash calculation on a file identifier (the identifier is, for example, an FSID or an FID) carried in the lock request, determines, according to a calculation result, a lock server whose management range includes the file, and sends the lock request to the lock server for corresponding processing. A hashing algorithm used to perform hash calculation on the file identifier needs to be the same as the hashing algorithm used to generate the consistent hashing ring. For example, a file identifier carried in the lock request is (foo2.txt), and the lock proxy performs hash calculation on the file identifier (foo2.txt). An obtained result is 6500, and it can be seen that, as shown in FIG. 2, the result falls within a range between the lock server 1 and the lock server 2 in the consistent hashing ring, the range is the management range of the lock server 2, and the lock request is processed by the lock server 2.

When a fault occurs in the lock server 2, the lock proxy identifies the lock server 2 in the consistent hashing ring as faulty. In this case, after receiving a lock request, the lock proxy performs hash calculation on file information (foo3.txt) carried in the lock request, and an obtained result is 7500 and falls within a range between the lock server 1 and the lock server 2 in the consistent hashing ring. However, the lock server 2 is in a faulty state. A takeover lock server of the lock server 2 is the lock server 4 according to the consistent hashing ring, that is, the range is the management range of the lock server 4, and therefore the lock proxy sends the lock request to the lock server 4 for processing.

An existing technology may be used in the method for obtaining the consistent hashing ring using the consistent hashing algorithm according to names of nodes or IDs of lock servers. Details are not further described herein.

Based on the lock server management range and the lock server takeover relationship in the distributed system shown in FIG. 2, an embodiment of the present disclosure provides a method for processing lock permission in a distributed system. The method embodiment is applied to a lock server. A method implementation procedure of a protocol server and a lock proxy mentioned in this method embodiment is the same as the method described above, and is not separately described in this method embodiment again. A specific procedure is shown in FIG. 3.

The method may be applied to the distributed system shown in FIG. 1. In the distributed system in this embodiment of the present disclosure, there are four lock servers: a lock server 1, a lock server 2, a lock server 3, and a lock server 4. A quantity of the lock servers in this embodiment is merely an example, and a specific quantity is subject to an actual service requirement. An implementation principle thereof is the same as that in this embodiment.

Figure 3:
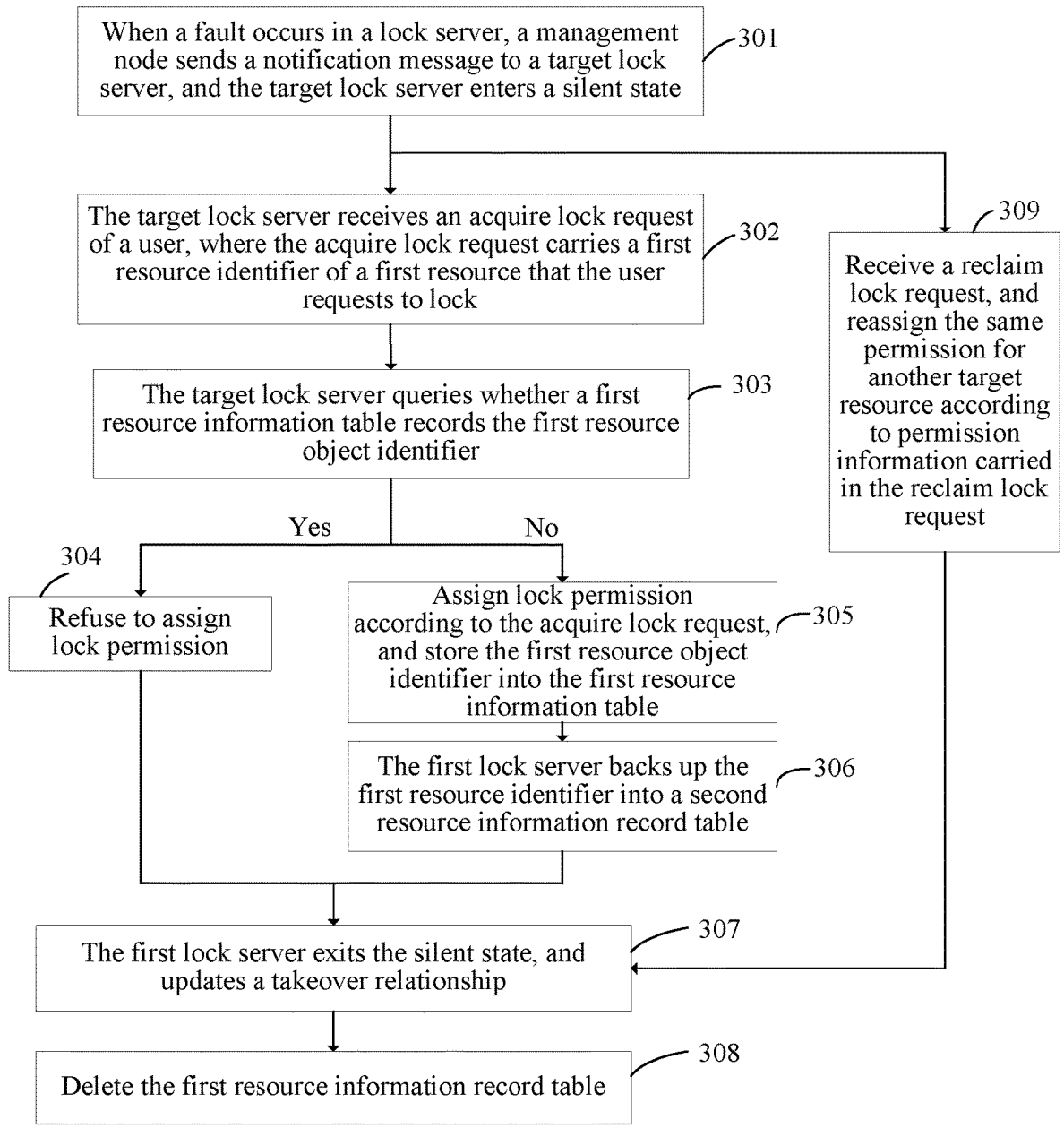
FIG. 3 is a flowchart of a method for processing a lock request according to an embodiment of the present disclosure.

Referring to FIG. 3, an example in which a takeover lock server is a first lock server and a lock server in which a fault occurs is a second lock server is used below to describe processing of an acquire lock request.

Step 301: When a fault occurs in a lock server in the distributed system, a management node broadcasts a notification message to the lock servers in the distributed system. In this embodiment, the lock server in which the fault occurs is a second lock server. Therefore, the notification message carries an ID of the second lock server as identification information of the second lock server. To differ from another notification message, a notification message that a fault occurs in a lock server is referred to as a first notification message.

The lock server that receives the first notification message determines, according to the ID carried in the first notification message and a locally stored lock server management range, whether the lock server is a takeover lock server of the second lock server. If the lock server is the takeover lock server of the second lock server, the lock server enters a silent state for a resource for which the second lock server has already assigned permission; if the lock server is not the takeover lock server of the second lock server, the lock server does not enter a silent state.

In addition, after receiving the first notification message, the first lock server may enable a timer. When the timer expires after a preset time, the first lock server exits the silent state, and updates a takeover relationship of the first lock server.

Another fault detection manner is: The takeover lock server regularly sends a detection message to a corresponding lock server according to information about the takeover relationship, and after detecting that a fault occurs in the corresponding lock server, the takeover lock server enters a silent state.

Step 302: The first lock server receives an acquire lock request, where the acquire lock request carries an identifier of a target resource. The target resource is a resource that needs to be locked, and is a requested object of the acquire lock request, or in other words, is a resource for which lock permission waits to be assigned.

When performing an operation such as a read or write operation on a resource in a storage system, a host needs to send an acquire lock request to a lock server using a protocol server and a lock proxy, where the acquire lock request carries a resource identifier of a resource that the host requests to lock. The resource identifier may be an ID of a file that needs to be operated or an ID of a logical unit number (LUN) that needs to be operated, and the acquire lock request requests permission to read a resource or to write to a resource.

The first lock server determines, according to the resource identifier, whether the requested resource belongs to a management range of the first lock server. For example, a hash calculation is performed on the resource identifier. If an obtained value belongs to a hash value range preset by the first lock server, the requested resource belongs to the management range of the first lock server; or if an obtained value does not belong to a hash value range preset by the first lock server, the requested resource does not belong to the management range of the first lock server.

The target resource that the acquire lock request requests to lock is located in the storage system, and the lock server manages lock permission for the target resource. This process is already described above, and is not separately described herein again.

There are many methods for sending, to the first lock server for processing, a lock request that is originally sent to the second lock server. For example, a router is directly disposed for the lock server and the host, and the router records the takeover relationship. When a fault occurs in the second lock server, the router sends, to the takeover lock server of the second lock server, the lock request that is originally sent to the second lock server. If no fault occurs in a lock proxy in a same node together with the second lock server, the foregoing solution may be used, and the lock proxy sends, to the takeover lock server of the second lock server, the lock request that is originally sent to the second lock server.

In the distributed system shown in FIG. 1, it is assumed that a fault occurs in the lock server 1, that is, the lock server 1 is the second lock server. According to the lock server management range and the lock server takeover relationship shown in FIG. 2, the lock server 2 is the takeover lock server of the lock server 1, and then the first lock server herein is the lock server 2.

Step 303: The first lock server queries a first resource information record list, where the first resource information record list records a resource identifier of a resource for which the second lock server has assigned lock permission.

The takeover lock server of the second lock server is in a silent state. After receiving an acquire lock request, each lock server including the first lock server first determines whether the lock server is currently in a silent state. If the lock server is in a silent state, each lock server further performs determining according to an identifier carried in the acquire lock request. If it is learned that the acquire lock request is an acquire lock request that belongs to a takeover range of the lock server, step 303 is performed. If it is not the first lock server but another lock server that receives the acquire lock request, skip step 303 and exit the entire procedure.

After a fault occurs in a node, a protocol server in the node becomes a faulty protocol server. A host that originally accesses the storage system using the faulty protocol server needs to access the storage system using a takeover protocol server of the faulty protocol server instead. That is, the takeover protocol server takes over work of the faulty protocol server. Before the takeover protocol server completes a takeover, a node in which the takeover protocol server is located is in a silent state (a silent range is a resource for which the faulty lock server has assigned permission). After the takeover is completed, the silent node exits the silent state. In addition, beyond a preset time, even if the takeover is not completed, the silent node exits the silent state.

A node in which a silent lock server is located is also in a silent state, that is, if the node includes a lock server, a protocol server, and a lock proxy, the protocol server and the lock proxy of the node also enter the silent state. During silence, the takeover protocol server takes over the work of the faulty protocol server, and a takeover process includes the host reapplies, using a reclaim lock request, for permission that has been previously possessed using the faulty protocol server.

During implementation of some approaches, a lock server in a silent state directly returns a rejection response message for any lock request. In this embodiment of the present disclosure, when in a silent state, the first lock server queries the first resource information record list. The first resource information record list stores the resource identifier of the resource for which the second lock server has assigned lock permission. The first resource information record list may not store specific content of the lock permission, for example, whether the lock permission is a read permission or a write permission. Therefore, occupied storage space is greatly reduced. The first resource information record list may be stored in the first lock server locally, or may be stored in another server, or may be stored in both the first lock server locally and another specified server. After entering the silent state, the first lock server stores the resource information record list into another specific lock server. For example, the resource information record list is stored in the first lock server locally. After the first lock server enters the silent state, the first lock server sends the resource information record list to a takeover lock server of the first lock server for storage. Alternatively, after a resource information record of the first lock server is changed, the resource information record list is synchronized in time to the takeover lock server of the first lock server for storage, to keep synchronization.

In this embodiment of the present disclosure, when the lock server receives an acquire lock request for a resource for the first time, the lock server sends, to the takeover lock server of the lock server, information that lock permission has been assigned for the resource, and the takeover lock server stores the information into the first resource information record list. Alternatively, the lock server may send the information after the lock permission is assigned for the resource. If the lock server subsequently receives a lock request for the same resource, regardless of whether requested permission is the same, the information is no longer sent to the takeover lock server of the lock server.

A specific implementation way is the following. Each time when receiving an acquire lock request, the lock server determines whether notification message "lock permission has been assigned for the resource" has been sent to the takeover lock server of the lock server; and if the notification message has not been sent to the takeover lock server of the lock server, the lock server sends the notification message; if the notification message has been sent to the takeover lock server of the lock server, the lock server does not send the notification message.

In addition to the resource identifier of the resource for which the second lock server has assigned the lock permission, the first resource information record list may further store an identifier of a resource for which the first lock server has assigned lock permission, for querying by the first lock server when the first lock server processes a lock request after exiting the silent state.

After step 303, step 304 or step 305 is performed.

Step 304: When there is the identifier of the target resource in the first resource information record list, the first lock server returns a rejection response message.

When the resource information record list stores the resource identifier, it indicates that the second lock server has assigned lock permission for the resource. In this case, the first lock server does not process the acquire lock request in order to avoid a conflict between lock permission for the same resource. The first lock server returns the rejection response message to the host using the lock proxy and the protocol server.

Certainly, in another embodiment, if it is found, by means of querying, that the first lock server has assigned permission for another acquire lock request, the first lock server also returns a rejection response message. This is not described in detail herein.

Step 305: When the resource information record list does not have the identifier of the resource, the first lock server assigns lock permission for the resource according to permission requested in the acquire lock request, and returns the assigned lock permission to a host using a lock proxy and a protocol server.

When the first resource information record list does not store the identifier of the resource, it indicates that no lock permission has been assigned for the resource corresponding to the resource identifier. In this case, no host performs an operation on the resource corresponding to the resource identifier. Therefore, the first lock server may assign lock permission for the resource corresponding to the resource identifier. The first lock server returns, using the corresponding lock proxy and protocol server, the assigned lock permission to the host that sends the request, and allows the host that sends the request to perform an operation on the resource.

In this way, by means of the method for processing an acquire lock request in a distributed system provided in this embodiment of the present disclosure, when a fault occurs in a lock server in the distributed system, a takeover lock server of the second lock server may process some acquire lock requests; and only when lock permission has been assigned for a requested resource, the takeover lock server does not process an acquire lock request for the resource for which the lock permission has been assigned. Therefore, in this embodiment, an impact range when a fault occurs in a lock server in the distributed system is controlled and narrowed down more precisely, and performance and reliability of the distributed system are improved.

After the lock permission is assigned, the first lock server may record the assigned permission into a local detailed resource information record list. The detailed resource information record list records specific content of the permission, such as a resource identifier, the lock permission, a type of the lock permission, and a current state of the lock permission. The detailed resource information record list and the first resource information record list may be separated, or may be integrated together.

After the first lock server takes over from the faulty server, the first lock server further sends a query message to a lock proxy of a non-faulty node. After receiving the query message, a lock proxy of each non-faulty node sends a feedback message to the first lock server, where the feedback message carries lock permission that is obtained through application by the lock proxy using the second lock server; and the first lock server records the lock permission into the detailed resource information record list of the lock server. Therefore, information recorded in the detailed resource information record list is updated. In addition to specific content of the permission assigned by the first lock server, the detailed resource information record list further records specific content of the permission assigned by the second lock server.

As described above, the acquire lock requests mentioned in steps 304 and 305 are both acquire lock requests that should be originally processed by the second lock server according to a takeover range. Even if the takeover lock server enters the silent state, the takeover lock server does not enter the silent state for resources that are originally in a processing range of the takeover lock server, and acquire lock requests for these resources may be processed in the same way as the takeover lock server does not enter the silent state.

After step 305, step 306 may further performed in the method embodiment.

Step 306: The first lock server stores the identifier of the target resource into a second resource information record list. A form of the second resource information record list is similar to a form of the first resource information record list, and the second resource information record list is used to record the resource identifier of the resource for which the first lock server has assigned the lock permission such that after a fault occurs in the first lock server, the takeover lock server of the first lock server may take over from the first lock server. Specific steps are similar to step 302 to step 305, and are not described in detail herein.

When the first lock server is not in the silent state, after assigning the lock permission for the target resource in the acquire lock request, the first lock server records the identifier of the target resource into the second resource information list. The second resource information list stores the resource identifier of the resource for which the first lock server has assigned the lock permission.

By means of step 306, when a fault occurs in the first lock server, the takeover lock server of the first lock server is switched from a non-silent state to the silent state, and a silent range is the resource for which the first lock server has assigned the permission. For an acquire lock request received by the takeover lock server of the first lock server, if the second resource information record list does not record the identifier of the target resource, the takeover lock server of the first lock server may assign the lock permission for the target resource according to the operation in step 305; otherwise, returns a rejection response message, like step 304.

During implementation of some approaches, after assigning lock permission for a resource, a lock server locally stores necessary information, such as a resource identifier, the lock permission, a type of the lock permission, and a current state of the lock permission. This is not separately described herein. In this embodiment of the present disclosure, after assigning the lock permission for the resource, the lock server further separately stores the resource identifier of the resource for which the lock permission is assigned. Optionally, the lock server stores the resource identifier into a separate resource information record list, and stores the resource information record list into a takeover lock server of the lock server.

Optionally, after step 304 or step 306, the method embodiment may further include the following step 307.

Step 307: Exit the silent state.

After all lock proxies report lock request content that is obtained through application using the second lock server to the first lock server, it means that the takeover work has been completed, and the first lock server may exit the silent state in advance.

In addition, a takeover time may be preset. After the preset time, regardless of whether the takeover work is completed, the first lock server exits the silent state.

After the first lock server exits the silent state, a management range of the first lock server and a lock server takeover relationship may be updated. The management range of the first lock server is extended, and an updated management range of the first lock server is a set of the old management range of the first lock server and a management range of the second lock server. After this step is performed, the first lock server completely takes over from the second lock server. Correspondingly, a takeover range in the system also needs to be changed. For example, a takeover range of the takeover lock server (which is named a third lock server) of the first lock server also needs to be updated as the management range of the first lock server is changed.

After receiving the first notification message, a lock server in the distributed system may enable a timer. After a preset time, a lock server in a silent state exits the silent state. As described above, the first notification message is sent by a management node in a broadcast manner, and is used to notify the lock server in the distributed system that a fault occurs in a lock server. After receiving the first notification message, a non-second lock server in the distributed system determines, according to a lock server takeover relationship that is stored locally or in a shared storage, whether the non-second lock server is the takeover lock server of the second lock server. If the non-second lock server is the takeover lock server of the second lock server, the non-second lock server enters a silent state, and enables the timer. After the preset time, the non-second lock server exits the silent state, and updates the lock server management range and the lock server takeover relationship. If the non-second lock server is not the takeover lock server of the second lock server, the non-second lock server does not enter the silent state, and keeps working normally.

In addition, after receiving the first notification message, a non-takeover lock server may further identify the second lock server in a lock server management range and a lock server takeover relationship that are locally stored as a faulty state, and the non-takeover lock server updates the lock server management range and the lock server takeover relationship.

Algorithms used by the lock servers in the distributed system to update a lock server management range and a lock server takeover relationship are the same. As described above, a specific manner may be performing hash calculation on an ID of a lock server, and details are not described herein again.

There are multiple manners for triggering updating of a takeover relationship. Alternatively, updating may be triggered by the management node. That is, after receiving a notification message of the management node, the lock server updates the management range and the lock server takeover relationship. In this way, the management node needs to enable a timer, and when the timer expires after a preset time, broadcasts the notification message to the distributed system. After receiving the notification message of the management node, non-second lock servers that can work normally in the distributed system separately update a lock server management range and a lock server takeover relationship that are locally stored.

Optionally, after step 307, the following steps may be included.

Step 308: After exiting the silent state, the first lock server deletes the first resource information record list.

The first resource information record list may be stored in the first lock server locally, or may be stored in another server. When the first resource information record list is stored in another server, the first lock server may instruct the another server to delete the first resource information record list.

The first resource information record list records the resource identifier of the resource for which the second lock server has assigned the lock permission, and content of the resource identifier is, for example, "resource ID: permission assigned". After the first lock server takes over a lock service of the second lock server, that is, the first lock server enters a silent state, when receiving an acquire lock request, the first lock server determines, according to the first resource information record list, whether to assign lock permission for a resource corresponding to a resource identifier carried in the acquire lock request. After exiting the silent state, the first lock server processes an acquire lock request according to a normal procedure, and in this case, information recorded in the first resource information record list is no longer used as a basis for processing a lock request. Therefore, in this case, the first resource information record list may be deleted. In this way, stored information can be minimized, occupied system resources of the distributed system can be reduced as much as possible, and impact on performance of the distributed system can be minimized.

As described above, during silence, the first lock server may continue to process a reclaim lock request for a resource in a silent range. Therefore, the first lock server may further perform step 309 between step 301 and step 307.

Step 309: The first lock server receives a reclaim lock request, where the reclaim lock request carries an identifier of another target resource and lock permission that is assigned by the second lock server for the another target resource, and the lock permission assigned by the second lock server is assigned by the second lock server for the another target resource before the fault occurs in the second lock server. Then, the first lock server reassigns lock permission for the another target resource according to the lock permission that is already assigned by the second lock server, where the reassigned lock permission is the same as the lock permission that is assigned by the second lock server to the another target resource before the fault occurs in the second lock server. A permission owner of the reassigned lock permission is also the same as a former permission owner. The reclaim lock request is initiated by a host, and before exiting the silent state, the first lock server may process multiple reclaim lock requests. After exiting the silent state, the first lock server no longer processes any reclaim lock request.

For example, after the second lock server assigns write permission for a resource to a permission owner, a fault occurs in the second lock server. After receiving a reclaim lock request, the first lock server reassigns the write permission for the resource to the permission owner. In this embodiment of the present disclosure, after assigning the lock permission for the resource for the first time, the lock server stores, into the takeover lock server, a resource identifier of the resource for which the lock permission is assigned. When a fault occurs in the lock server, the takeover lock server of the second lock server in a silent state determines, according to the stored resource identifier, whether a received acquire lock request may be processed. In this way, a range of an acquire lock request affected when a fault occurs in the lock server may be minimized. Moreover, because only the resource identifier is stored, few system resources are occupied, impact on the performance of the system is also weak, and stability and reliability of the entire distributed system are improved.

In the method mentioned above, to simplify backup and reduce occupied system resources as much as possible, only the resource identifier of the resource for which the lock permission is assigned is backed up. When there are sufficient system resources, information on a lock server may be completely backed up, that is, a detailed resource information record list of a lock server is completely backed up, for example, backed up into the takeover lock server of the first lock server. In this case, a principle of the processing method herein is similar to that of the foregoing method, but more information is backed up and occupies more system resources. However, because complete lock permission is backed up on the first lock server, when the first lock server takes over from the second lock server, it is not required that lock proxies on all nodes report lock permission obtained through application to the takeover lock server again. That is, the step, which is mentioned in step 305, of further sending, by the first lock server, a query message to a lock proxy of a non-faulty node may be omitted. Therefore, a silent time may be minimized.

The foregoing method may be applied to a virtualized distributed system. In addition, in the virtualized distributed system, a lock server runs in a virtual machine.

In a virtualized scenario, if a takeover lock server of a lock server is disposed in a physical node, when a fault occurs in the current lock server, because data is transmitted faster in the same physical node, a takeover time may be shortened.

In the virtualized scenario, when a node in which the second lock server is located returns to normal, a new lock server may be deployed in the node. The another first lock server may be directly migrated to the node, that is, an address mapping relationship of the another first lock server is modified. Alternatively, a new lock server may be created in the node, and a lock service on the another first lock server is migrated to the newly created lock server. In the virtualized distributed system, to simplify operations, the another first lock server is directly migrated to the node.

When meeting a particular condition, a lock server management range and a lock server takeover relationship of a lock server in the distributed system may be updated. As described above, when a fault occurs in a lock server in the distributed system, a non-faulty lock server updates a lock server management range and a lock server takeover relationship according to a preset rule. In addition, the management node may instruct the non-second lock server in the distributed system to update the lock server management range and the lock server takeover relationship. Alternatively, the management node may update the lock server takeover relationship, and then broadcast an updated lock server takeover relationship to the lock servers in the distributed system. For example, when a new lock server joins, the management node instructs the lock servers in the distributed system to separately update a lock server takeover relationship.

The takeover relationship is updated based on two possible cases: One is that a lock server is no longer used due to a fault or another reason; the other is that a new lock server joins. The two cases are separately described below.

With reference to the method embodiment described above, after the non-second lock server in the distributed system receives the first notification message of the management node (the first notification message is used to notify the non-second lock server in the distributed system that a fault occurs in a lock server in the distributed system), each non-faulty lock server in the distributed system updates a lock server management range and a lock server takeover relationship of the non-faulty lock server. The non-second lock server may update the management range and the lock server takeover relationship of the non-second lock server according to a preset method (for example, a consistent hashing algorithm). Alternatively, the management node updates the lock server management range and the lock server takeover relationship, and then broadcasts the lock server management range and the lock server takeover relationship to the lock servers in the distributed system. The lock server management range and the lock server takeover relationship of the non-second lock server may be stored in the non-second lock server locally, or may be stored in a shared storage. This is not limited in this method embodiment.

When a new lock server joins in the distributed system, a lock server in the distributed system also needs to update a lock server management range and a lock server takeover relationship of the lock server. The lock server in the distributed system receives a second notification message, where the second notification message carries an identifier of the new lock server. The lock server in the distributed system updates the lock server management range and the lock server takeover relationship of the lock server.

When the new lock server joins in the distributed system, the management node sends a second notification message to the lock server in the distributed system, where the second notification message carries the ID of the new lock server. After receiving the second notification message, the lock server (including the new lock server) obtains, by means of calculation, a new lock server management range and a new lock server takeover relationship according to a preset rule (for example, a consistent hashing algorithm). Similarly, alternatively, the management node may update the lock server management range and the lock server takeover relationship, and then send an updated lock server management range and an updated lock server takeover relationship to the lock servers in the distributed system.

After the lock server management range and the lock server takeover relationship are updated, each lock server determines a new backup lock server of the lock server according to the lock server management range and the lock server takeover relationship that are obtained after the update, and sends, to the new backup lock server, a resource information record list or a resource identifier that needs to be stored to the new backup lock server.

Figure 4:
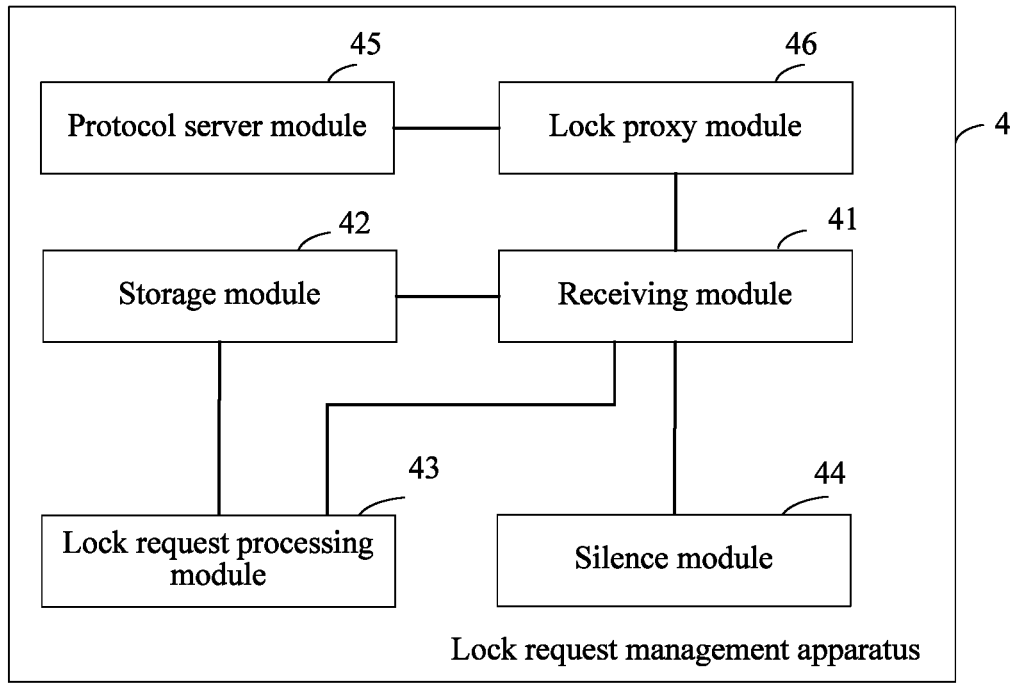
FIG. 4 is a structural diagram of an embodiment of a lock request management apparatus according to the present disclosure.

An embodiment of the present disclosure further provides a lock request management apparatus 4 for processing a lock request. The lock request management apparatus 4 is, for example, a lock server, and a structure of the lock request management apparatus 4 is shown in FIG. 4. The lock request management apparatus 4 may be applied to FIG. 3 and the foregoing method embodiment. Because detailed descriptions are already made in the method embodiment and the corresponding FIG. 3, only functions of modules of the lock management request apparatus 4 are described below briefly. For all detailed functions, refer to the foregoing method embodiment. Multiple lock request management apparatuses 4 may form a distributed lock management system.

The lock server 4 includes a receiving module 41, a storage module 42, and a lock request processing module 43, and a silence module 44.

The receiving module 41 is configured to receive a first acquire lock request and a notification message, where the first acquire lock request carries an identifier of a first resource; the storage module 42 is configured to store a lock management range of another lock request management apparatus and a first resource information record list, where the first resource information record list records a resource identifier of a resource for which the another lock request management apparatus has assigned lock permission; the lock request processing module 43 is configured to process an acquire lock request received by the storage module 42; and the silence module 44 is configured to, after it is learned, according to the notification message, that a fault occurs in the another lock request management apparatus, set the lock request management apparatus 4 to a silent state, where a silent range is the resource for which the another lock request management apparatus has assigned permission, where after the lock request management apparatus 4 enters the silent state, the lock request processing module 43 is configured to, when the acquire lock request belongs to the silent range, query the first resource information record list; and if the first resource information record list does not record the identifier of the first resource, assign lock permission for the first resource according to the first acquire lock request.

Optionally, after the lock request management apparatus 4 enters the silent state, the receiving module 41 is further configured to receive a second acquire lock request, where the second acquire lock request is used to request to lock a second resource, and the second acquire lock request carries an identifier of the second resource; and the lock request processing module 43 is further configured to, after detecting that the second resource belongs to a management range of the lock request management apparatus 4, assign lock permission for the second resource according to the second acquire lock request.

Optionally, after the lock request management apparatus 4 enters the silent state, the receiving module 41 is further configured to receive a third acquire lock request, where the third acquire lock request is used to request to lock a third resource, and the third acquire lock request carries an identifier of the third resource; the lock request processing module 43 is further configured to, after detecting that the third resource belongs to the management range of the another lock request management apparatus, query the first resource information record list; and if the first resource information record list has recorded the resource identifier of the resource requested in the third acquire lock request, refuse to assign lock permission for the third resource according to the third acquire lock request.

Optionally, after the lock request management apparatus 4 enters the silent state, the lock request processing module 43 is further configured to receive a reclaim lock request, where the reclaim lock request carries an identifier of a fourth resource and permission that is assigned by the another lock request management apparatus for the fourth resource, and the fourth resource is a resource for which the another lock request management apparatus has assigned permission; and reassign the same permission for the fourth resource according to the permission that has been assigned by the another lock request management apparatus.

Optionally, the storage module 42 is further configured to receive a first notification message, where the first notification message carries identification information of the another lock request management apparatus; the receiving module 41 is further configured to, after it is determined, according to an identifier of the another lock request management apparatus and a takeover relationship of the lock request management apparatus 4, that the lock request management apparatus is a takeover lock request management apparatus 4 of the another lock request management apparatus, send the lock management range of the another lock request management apparatus to the storage module 42; and that the foregoing storage module 42 is configured to store the lock management range of the another lock request management apparatus includes the storage module 42 is configured to receive the lock management range of the another lock request management apparatus from the receiving module 41, and store the lock management range.

Optionally, the lock request management apparatus 4 may further include a protocol server module 45 and a lock proxy module 46. The protocol server module 45 is configured to receive a packet from a host, parse out the first acquire lock request from the packet, and forward the first acquire lock request to the lock proxy module 46. The lock proxy module 46 is configured to perform determining according to the identifier of the first resource carried in the first acquire lock request; and when determining that the lock request processing module 43 manages the first resource, send the first acquire lock request to the lock request processing module 43 using the receiving module 41.

Optionally, the silence module 44 is further configured to, after permission is reassigned for all resources for which the another lock request management apparatus has assigned permission, enable the lock request management apparatus to exit the silent state; or after a preset time, enable the lock request management apparatus 4 to exit the silent state.

Optionally, the storage module 42 is further configured to, after the lock request management apparatus 4 exits the silent state, update the management range of the lock request management apparatus, where an updated management range of the lock request management apparatus includes the management range of the lock request management apparatus and the management range of the another lock request management apparatus.

Figure 5:
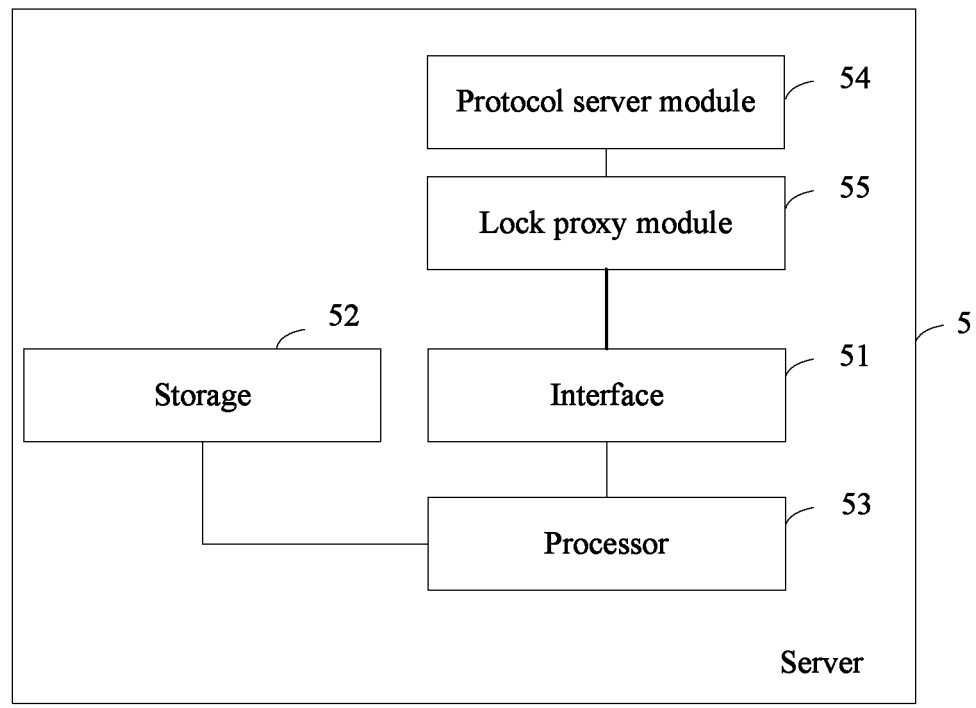
FIG. 5 is a structural diagram of an embodiment of a server according to the present disclosure.

An embodiment of the present disclosure further provides another server 5 in a distributed system, and a structure of the server 5 is shown in FIG. 5. The server 5 includes an interface 51, a memory 52, and a processor 53. The server 5 may execute the method in the method embodiment. The processor 53 of the server 5 performs steps of the method. The interface 51 provides an external data interface, and the memory 52 provides data storage space. The server 5 is only briefly described below. For specific content, refer to the foregoing description.

The interface 51 provides an external interface to, for example, receive an acquire lock request or a reclaim lock request.

The memory 52 is configured to store a first resource information record list, where the first resource information record list records a resource identifier of a resource for which the another server has assigned lock permission. It may be learned from the method embodiment that the memory 52 may be further configured to store other information, for example, a second resource information record list or a detailed resource information record list, and the memory 52 may be further configured to store the lock management range of the another server.

The processor 53 is configured to run a program to perform steps in the method embodiment. For example, after learning that a fault occurs in the another server, setting the server 5 to a silent state, where a silent range of the silent state is the resource for which the another server has assigned permission; receiving a first acquire lock request, where the first acquire lock request is used to request to lock a first resource, and the first acquire lock request carries an identifier of the first resource; detecting that the first resource belongs to the management range of the another lock server; querying, by the first lock server, the first resource information record list; and if the first resource information record list does not record the identifier of the first resource, assigning, by the first lock server, lock permission for the first resource according to the first acquire lock request.

Operations in the method embodiment, for example, entering the silent state, exiting the silent state, querying, determining, and assigning permission, may be all executed by the processor 53.

Optionally, the server 5 may further include a protocol server module 54 and a lock proxy module 55.

The protocol server module 54 is configured to receive a packet from a host, and parse out the first acquire lock request from the packet; and is further configured to forward the first acquire lock request to the lock proxy module 55. The lock proxy module 55 is configured to perform determining according to the identifier of the first resource carried in the first acquire lock request; and when determining that the server 5 manages the first resource, send the first acquire lock request to the interface 51.

A form of a "list" mentioned in each embodiment of the present disclosure, for example, the first resource information record list, is not limited to a sheet or a list, but content stored in the "list" is used as a definition of the "list".

Each aspect of the present disclosure or a possible implementation manner of each aspect may be implemented as a system, a method, or a computer program product. Therefore, each aspect of the present disclosure or a possible implementation manner of each aspect may use a form of a complete hardware embodiment, a complete software embodiment (including firmware, resident software, and the like), or an embodiment combining software and hardware, which are collectively referred to as a "circuit", a "module", or a "system" herein. In addition, each aspect of the present disclosure or the possible implementation manner of each aspect may use a form of a computer program product, where the computer program product refers to computer readable program code stored in a computer readable medium.

The computer readable medium may be a computer readable signal medium or a computer readable storage medium. The computer readable storage medium includes but is not limited to electronic, magnetic, optical, electromagnetic, infrared, or semiconductor systems, devices, or apparatuses, or any appropriate combination of the foregoing items, such as a random access memory (RAM), a read-only memory (ROM), an erasable programmable read-only memory (EPROM or flash memory), a fiber, and a porlist read-only memory (CD-ROM).

A processor in a computer reads computer readable program code stored in a computer readable medium such that the processor can execute a function and an action specified in each step or a combination of steps in a flowchart, and an apparatus is generated to implement a function and an action specified in each block or a combination of blocks in a block diagram.

A person skilled in the art may make various modifications and variations to the present disclosure without departing from the spirit and scope of the present disclosure. In this way, the present disclosure is intended to cover these modifications and variations provided that they fall within the scope of protection defined by the following claims and their equivalent technologies.

What is claimed is:

1. A method applied to a first lock server for processing a lock request, wherein the first lock server is a takeover lock server of a second lock server, wherein the first lock server stores a lock management range of the second lock server, and wherein the method comprises:

entering, by the first lock server, a silent state after a fault occurs in the second lock server, wherein a silent range of the silent state is a resource for which the second lock server has assigned permission;

receiving, by the first lock server, a first acquire lock request requesting to lock a first resource, wherein the first acquire lock request carries an identifier of the first resource;

detecting, by the first lock server, that the first resource belongs to the lock management range of the second lock server;

querying, by the first lock server, a first resource information record set comprising a resource identifier of the resource for which the second lock server has assigned lock permission;

assigning, by the first lock server, lock permission for the first resource according to the first acquire lock request when the first resource information record set does not record the identifier of the first resource;

receiving, by the first lock server, a third acquire lock request requesting to lock a third resource, wherein the third acquire lock request carries an identifier of the third resource;

detecting, by the first lock server, that the third resource belongs to the lock management range of the second lock server;

querying, by the first lock server, the first resource information record set; and refusing, by the first lock server, to assign lock permission for the third resource according to the third acquire lock request when the first resource information record set has recorded the resource identifier of the resource requested in the third acquire lock request.

2. The method of claim 1, wherein after entering the silent state, the method further comprises:

receiving, by the first lock server, a second acquire lock request requesting to lock a second resource, wherein the second acquire lock request carries an identifier of the second resource;

detecting, by the first lock server, that the second resource belongs to a management range of the first lock server; and assigning, by the first lock server, lock permission for the second resource according to the second acquire lock request.

3. The method of claim 1, further comprising recording, by the first lock server, the identifier of the first resource into a second resource information record set used to record a resource identifier of a resource for which the first lock server has assigned lock permission, wherein the second resource information record set is stored in a third lock server.

4. The method of claim 1, wherein storing the lock management range of the second lock server comprises:

receiving, by the first lock server, a first notification message carrying identification information of the second lock server;

determining, by the first lock server according to an identifier of the second lock server and a lock server takeover relationship, that the first lock server is the takeover lock server of the second lock server; and receiving, by the first lock server, the lock management range of the second lock server and storing the lock management range.

5. The method of claim 1, wherein before entering the silent state, the method further comprises:
receiving, by a protocol server, a packet from a host;
parsing, by a protocol server, out the first acquire lock request from the packet;
forwarding, by the protocol server, the first acquire lock request to a lock proxy; and
sending the first acquire lock request to the first lock server when determining that the first lock server manages the first resource.

6. The method of claim 1, wherein after entering the silent state, the method further comprises:
receiving a reclaim lock request carrying an identifier of a fourth resource and permission assigned by the second lock server for the fourth resource, wherein the fourth resource is a resource for which the second lock server has assigned permission; and
reassigning a same permission for the fourth resource according to a permission that has been assigned by the second lock server.

7. The method of claim 6, further comprising:
exiting, by the first lock server, the silent state after permission is reassigned for all resources for which the second lock server has assigned permission; or
exiting, by the first lock server, the silent state after a preset time.

8. The method of claim 7, wherein after exiting the silent state, the method further comprises updating, by the first lock server, the lock management range of the first lock server, wherein an updated management range of the first lock server comprises the lock management range of the first lock server before the update and the lock management range of the second lock server.

9. The method of claim 1, wherein before the fault occurs, the method further comprises backing up the identifier of the resource for which lock permission is assigned by the second lock server by the first lock server.

10. A server configured as a takeover lock management server of another server, wherein the server comprises:
an interface configured to receive an acquire lock request;
a memory configured to store a lock management range of the another server and a first resource information record set, wherein the first resource information record set comprises a resource identifier of a resource for which the another server has assigned lock permission; and
a processor coupled to the interface and the memory and configured to:
set the server to a silent state after that a fault occurs in the another server, wherein a silent range of the silent state is the resource for which the another server has assigned the permission;
receive a first acquire lock request requesting to lock a first resource, wherein the first acquire lock request carries an identifier of the first resource;
detect that the first resource belongs to the lock management range of the another server;
query, by the server, the first resource information record set;

assign, by the server, lock permission for the first resource according to the first acquire lock request when the first resource information record set does not record the identifier of the first resource;
receive a third acquire lock request requesting to lock a third resource, wherein the third acquire lock request carries an identifier of the third resource;
detect that the third resource belongs to the lock management range of the another server;
query the first resource information record set; and
refuse to assign lock permission for the third resource according to the third acquire lock request when the first resource information record set has recorded the resource identifier of the resource requested in the third acquire lock request.

11. The server of claim 10, wherein the processor is further configured to:
receive a second acquire lock request, the second acquire lock request requesting to lock a second resource, wherein the second acquire lock request carries an identifier of the second resource;
detect that the second resource belongs to a management range of the server; and
assign lock permission for the second resource according to the second acquire lock request.

12. The server of claim 10, wherein the processor is further configured to:
receive a first notification message carrying identification information of the another server; and
send the lock management range of the another server to the memory after determining, according to an identifier of the another server and a server takeover relationship, that the server is a takeover server of the another server.

13. The server of claim 10, wherein the processor is further configured to:
receive a packet from a host;
parse out the first acquire lock request from the packet;
forward the first acquire lock request to a lock proxy component; and
send the first acquire lock request to the interface when determining that the server manages the first resource.

14. The server of claim 10, wherein the processor is further configured to:
receive a reclaim lock request carrying an identifier of a fourth resource and permission that is assigned by the another server for the fourth resource, wherein the fourth resource is a resource for which the another server has assigned permission; and
reassign a same permission for the fourth resource according to a permission that has been assigned by the another server.

15. The server of claim 14, wherein the processor is further configured to:
enable the server to exit the silent state after permission is reassigned for all resources for which the another server has assigned permission; or
enable the server to exit the silent state after a preset time.

16. The server of claim 15, wherein the processor is further configured to update the lock management range of the server, wherein an updated lock management range of the server comprises the lock management range of the server and the lock management range of the another server.

17. The server of claim 10, wherein before the fault occurs, the processor is further configured to back up the identifier of the resource for which lock permission is assigned by the another server.

18. A method for processing a lock request, applied to a first lock server, wherein the first lock server is a takeover lock server of a second lock server, wherein the first lock server stores a lock management range of the second lock server, and wherein the method comprises:
- receiving, by the first lock server, a first notification message carrying identification information of the second lock server;
- determining, by the first lock server according to an identifier of the second lock server and a lock server takeover relationship, that the first lock server is the takeover lock server of the second lock server;
- receiving, by the first lock server, the lock management range of the second lock server and storing the lock management range of the second lock server;
- entering, by the first lock server, a silent state after a fault occurs in the second lock server, wherein a silent range of the silent state is a resource for which the second lock server has assigned permission;
- receiving, by the first lock server, a first acquire lock request requesting to lock a first resource, wherein the first acquire lock request carries an identifier of the first resource;
- detecting, by the first lock server, that the first resource belongs to the lock management range of the second lock server;
- querying, by the first lock server, a first resource information record set comprising a resource identifier of the resource for which the second lock server has assigned lock permission; and
- assigning, by the first lock server, lock permission for the first resource according to the first acquire lock request when the first resource information record set does not record the identifier of the first resource.

19. The method of claim 18, wherein after entering the silent state, the method further comprises:
- receiving a reclaim lock request carrying an identifier of a fourth resource and permission assigned by the second lock server for the fourth resource, wherein the fourth resource is a resource for which the second lock server has assigned permission; and
- reassigning the same permission for the fourth resource according to the permission that has been assigned by the second lock server.

20. The method of claim 19, further comprising:
- exiting, by the first lock server, the silent state after permission is reassigned for all resources for which the second lock server has assigned permission; or
- exiting, by the first lock server, the silent state after a preset time.

* * * * *